United States Patent
Kodama et al.

(10) Patent No.: US 11,007,875 B2
(45) Date of Patent: May 18, 2021

(54) COMMUNICATION DEVICE, CHARGE COMMUNICATION SYSTEM, TRANSPORTATION APPARATUS AND FAULT DIAGNOSIS METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP); Honda Motor Co., Ltd., Tokyo (JP)

(72) Inventors: Yuichi Kodama, Yokkaichi (JP); Ryo Okada, Yokkaichi (JP); Takeshi Hagihara, Yokkaichi (JP); Kazuhiko Nii, Yokkaichi (JP); Koji Saotome, Wako (JP); Shuta Fukuda, Wako (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP); Honda Motor Co., Ltd., Tokyo (JP)

( * ) Notice: Subject to any disclaimer, the term of this patent is extended or adjusted under 35 U.S.C. 154(b) by 148 days.

(21) Appl. No.: 16/310,277

(22) PCT Filed: Jun. 2, 2017

(86) PCT No.: PCT/JP2017/020656
§ 371 (c)(1),
(2) Date: Dec. 14, 2018

(87) PCT Pub. No.: WO2017/217259
PCT Pub. Date: Dec. 21, 2017

(65) Prior Publication Data
US 2019/0329666 A1  Oct. 31, 2019

(30) Foreign Application Priority Data

Jun. 17, 2016 (JP) ............... JP2016-121113

(51) Int. Cl.
*B60L 3/00* (2019.01)
*B60L 50/60* (2019.01)
(Continued)

(52) U.S. Cl.
CPC ............. *B60L 3/00* (2013.01); *B60L 50/60* (2019.02); *B60L 53/14* (2019.02); *B60L 53/16* (2019.02);
(Continued)

(58) Field of Classification Search
USPC ........................................... 701/22
See application file for complete search history.

(56) References Cited

U.S. PATENT DOCUMENTS

2009/0184689 A1* 7/2009 Kressner ............ G01R 22/063
320/162
2010/0213896 A1 8/2010 Ishii et al.
(Continued)

FOREIGN PATENT DOCUMENTS

JP 2009-071989 A 4/2009
JP 2013-090543 A 5/2013
(Continued)

OTHER PUBLICATIONS

International Search Report, Application No. PCT/JP2017/020656 dated Aug. 22, 2017.

*Primary Examiner* — Tyler D Paige
(74) *Attorney, Agent, or Firm* — Honigman LLP

(57) ABSTRACT

A communication device comprises a connector to which a communication line is to be connected for sending and receiving a control signal concerning charge control
(Continued)

between a transportation apparatus and a charging apparatus, a modem outputting a modulated signal obtained by modulating information to be sent and demodulating the modulated signal input, and a first internal communication line and a second internal communication line each being connected to the connector and the modem, the first internal communication line and the second internal communication line respectively being for sending the modulated signal and being for receiving the modulated signal, and sends and receives the modulated signal by superposing the modulated signal on the control signal. The modem outputs a beacon signal for communication, and comprises a branch line branched at an intermediate location of the second internal communication line, a wave detector circuit that detects the beacon signal transmitted to the branch line by way of the first internal communication line, the connector and the second internal communication line, and a diagnosis unit that performs a fault diagnosis of its own device based on a signal obtained through detection by the wave detector circuit.

6 Claims, 8 Drawing Sheets

(51) Int. Cl.
*B60L 53/14* (2019.01)
*G07C 5/08* (2006.01)
*H04B 3/54* (2006.01)
*B60L 53/66* (2019.01)
*B60L 53/16* (2019.01)
*H04B 17/00* (2015.01)
*B60K 6/22* (2007.10)

(52) U.S. Cl.
CPC ............... *B60L 53/66* (2019.02); *G07C 5/08* (2013.01); *H04B 3/54* (2013.01); *H04B 17/00* (2013.01); *B60K 6/22* (2013.01); *B60Y 2200/91* (2013.01); *B60Y 2200/92* (2013.01); *B60Y 2300/91* (2013.01)

(56) References Cited

U.S. PATENT DOCUMENTS

| | | | |
|---|---|---|---|
| 2013/0099740 A1 | 4/2013 | Takashima et al. | |
| 2013/0300429 A1* | 11/2013 | Jefferies | B60L 53/16 324/511 |
| 2013/0346010 A1* | 12/2013 | Schulz | B60L 3/0046 702/122 |
| 2013/0346025 A1* | 12/2013 | Schulz | B60L 53/60 702/182 |
| 2014/0355452 A1 | 12/2014 | Nii et al. | |
| 2015/0061584 A1 | 3/2015 | Okada et al. | |
| 2019/0027867 A1* | 1/2019 | Ognjanovski | B60L 53/16 |
| 2019/0329666 A1* | 10/2019 | Kodama | H04B 3/54 |

FOREIGN PATENT DOCUMENTS

| | | |
|---|---|---|
| JP | 2013-090544 A | 5/2013 |
| JP | 2013-187850 A | 9/2013 |
| JP | 2013-215059 A | 10/2013 |
| JP | 2016-096473 A | 5/2016 |
| WO | 2013/084998 A1 | 6/2013 |

* cited by examiner

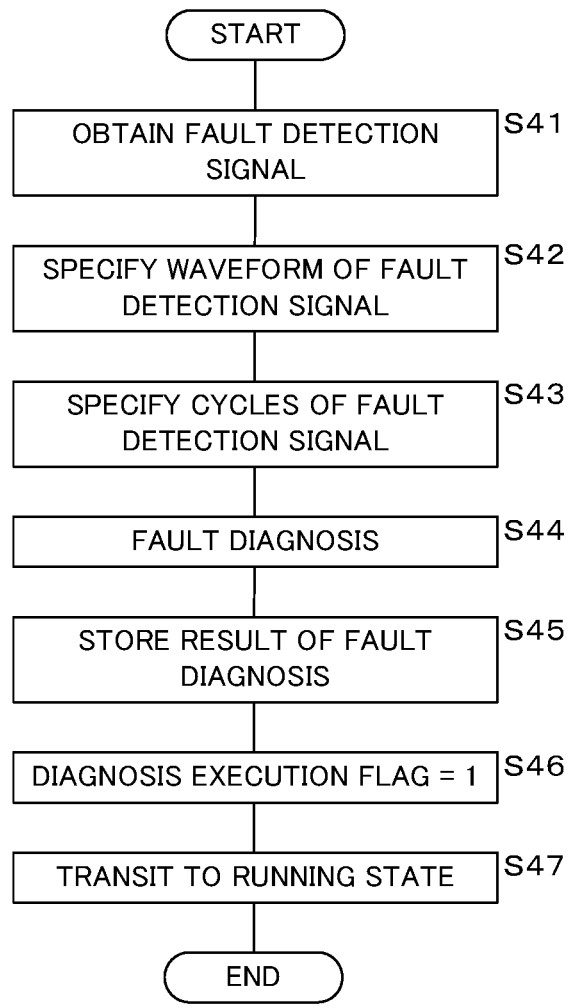

COMMUNICATION DEVICE, CHARGE COMMUNICATION SYSTEM, TRANSPORTATION APPARATUS AND FAULT DIAGNOSIS METHOD

CROSS-REFERENCE TO RELATED APPLICATIONS

This application is the national phase under 35 U. S. C. § 371 of PCT International Application No. PCT/JP2017/ 020656 which has an International filing date of Jun. 2, 2017 and designated the United States of America.

FIELD

The present invention relates to a communication device, a charge communication system, a transportation apparatus and a fault diagnosis method.

The present application claims the benefit of Japanese Patent Application No. 2016-121113 filed on Jun. 17, 2016, the entire contents of which are hereby incorporated by reference.

BACKGROUND

A plug-in hybrid electric vehicle (PHEV) using an electric motor and an engine in combination as well as an electric vehicle (EV) driven by an electric motor without being provided with an engine have been in widespread use. A vehicle such as a plug-in hybrid electric vehicle, an electric vehicle and so on has a battery to supply power for driving the electric motor while performing the charging of the battery by using an external charging station.

When performing the charging of the battery, the vehicle and the charging station send and receive to and from each other various types of information such as the control information concerning charging, the identifying information of the vehicle, the accounting information and so on. For example, the vehicle and the charging station are provided with CPLT communication devices that send and receive to and from each other control pilot (CPLT) signals indicative of the connection of a charging cable, the completion of the preparation for charging, the charging state and so on through communication lines for the charging cable. The vehicle and the charging station may send and receive simple information by using control pilot signals, but have a limited information amount that may be sent and received. Hence, it has been considered that the vehicle and the charging station are provided with PLC communication devices so that a higher degree of information communication is achieved. The PLC communication device may send and receive more information by sending and receiving control pilot signals on each of which other signals are superposed.

Meanwhile, as the information sent and received to and from the vehicle and the charging station increases, techniques of detecting the fault of the communication line between the vehicle and the charging station and the fault of the communication device have increased in importance.

Japanese Patent Application Laid-Open No. 2009-71989 discloses a charging control apparatus that is capable of detecting a disconnection of the communication line extending between a vehicle and a charging station. Moreover, Japanese Patent Application Laid-Open No. 2013-90544 discloses an electronic control device that is capable of detecting a failure of a switching element to change the voltage level of a pilot signal and a disconnection and a ground failure of the communication lines.

SUMMARY

A communication device according to the present aspect is a communication device that comprises a connector to which a communication line is to be connected for sending and receiving a control signal concerning charge control between a transportation apparatus and a charging station, a modem outputting a modulated signal obtained by modulating information to be sent and demodulating the modulated signal input, and a first internal communication line and a second internal communication line each being connected to the connector and the modem, the first internal communication line and the second internal communication line respectively being for sending the modulated signal and being for receiving the modulated signal, and the modem is capable of outputting a beacon signal for communication to the charging station through the first internal communication line and the communication line and outputting the beacon signal through the first internal communication line and the second internal communication line, and sends and receives the modulated signal by superposing the modulated signal on the control signal. The communication device comprises: a branch line branched from an intermediate location of the second internal communication line; a wave detector circuit that detects the beacon signal transmitted to the branch line by way of the first internal communication line, the connector and the second internal communication line; and a diagnosis unit that performs a fault diagnosis of its own device based on a signal obtained through detection by the wave detector circuit.

Here, supplementary explanation is made on a term described in claims. The term "own device" indicates a communication device. That is, "a fault diagnosis of an own device" indicates the fault diagnosis of at least all or part of the connector, the modem, the first internal communication line, the second internal communication line and the communication line, and various circuits and elements provided along the communication path that are contained in the communication device equivalent to "own device." The explanation is common to all the claims.

It is noted that the present application may be realized as a communication device having such a characteristic processing unit as well as may be realized as a fault diagnosis method regarding such characteristic processing as steps and as a program causing a computer to execute such steps. Moreover, the present application may be realized as a semiconductor integrated circuit realizing a part or all of the communication device as well as may be realized as another system or a transportation apparatus including the communication device.

The above and further objects and features will more fully be apparent from the following detailed description with accompanying drawings.

BRIEF DESCRIPTION OF THE DRAWINGS

FIG. 8 is a flowchart depicting the processing procedure to be executed by the on-vehicle PLC communication device in a fault diagnosis state.

DETAILED DESCRIPTION

Problems to be Solved by Disclosure

Figure 1:
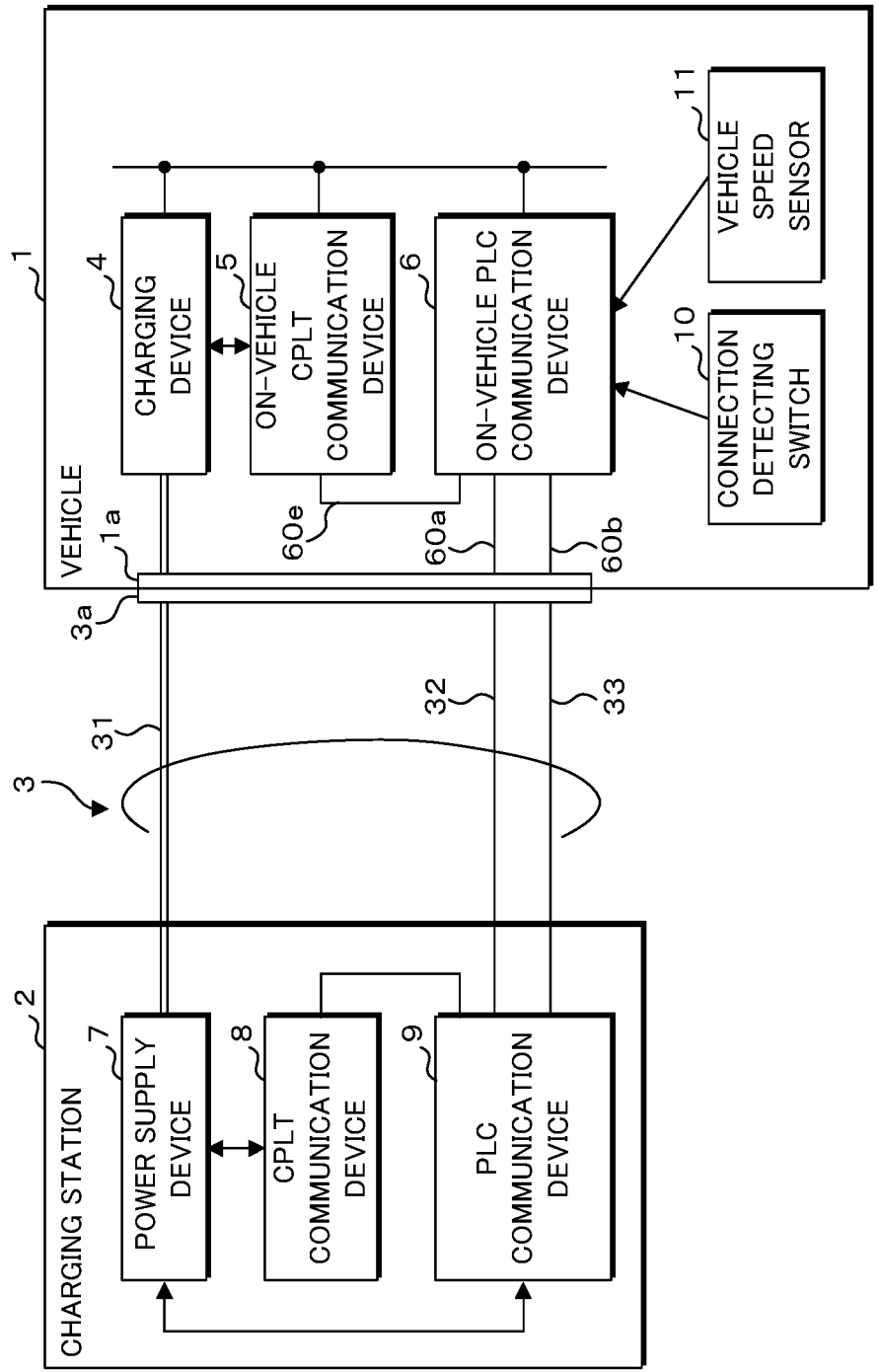
FIG. 1 is a block diagram illustrating one example of the configuration of a charge communication system according to Embodiment 1.

The related art has a problem in which the fault external to the PLC communication device may be detected such as the disconnection of a communication line through which a control pilot signal is transmitted whereas the fault internal to the PLC communication device cannot be detected.

The present disclosure is to provide a communication device capable of performing a fault diagnosis of the inside of its own device, a charge communication system, a transportation apparatus and a fault diagnosis method.

Effects of Disclosure

According to the present disclosure, it is possible to provide a communication device capable of performing a fault diagnosis of the inside of its own device, a charge communication system, a transportation apparatus and a fault diagnosis method.

Description of Embodiments of Present Application

Embodiments of the present disclosure are first listed. Moreover, at least parts of the embodiments that will be described below may arbitrarily be combined.

(1) A communication device according to this aspect comprises a connector to which a communication line is to be connected for sending and receiving a control signal concerning charge control between a transportation apparatus and a charging station, a modem outputting a modulated signal obtained by modulating information to be sent and demodulating the modulated signal input, and a first internal communication line and a second internal communication line each being connected to the connector and the modem, the first internal communication line and the second internal communication line respectively being for sending the modulated signal and being for receiving the modulated signal. The modem is capable of outputting a beacon signal for communication to the charging station through the first internal communication line and the communication line and outputting the beacon signal through the first internal communication line and the second internal communication line, and sends and receives the modulated signal by superposing the modulated signal on the control signal. The communication device comprises: a branch line branched at an intermediate location of the second internal communication line; a wave detector circuit that detects the beacon signal transmitted to the branch line by way of the first internal communication line, the connector and the second internal communication line; and a diagnosis unit that performs a fault diagnosis of its own device based on a signal obtained through detection by the wave detector circuit.

(2) Such a configuration is preferable that the communication device further comprises an obtainment unit that obtains connection information indicative of a connection or a disconnection of a charging cable of the charging station and the transportation apparatus, and the diagnosis unit performs a fault diagnosis of its own device if the connection information indicates the disconnection of the charging cable.

(3) Such a configuration is preferable that the communication device further comprises a speed information obtainment unit that obtains speed information indicative of a speed of the transportation apparatus mounted with its own device, and the diagnosis unit performs a fault diagnosis of its own device if a speed indicated by the speed information is equal to or larger than a predetermined value.

(4) Such a configuration is preferable that the modem comprises an output unit connected to the first internal communication line and an input unit connected to the second internal communication line, and outputs the beacon signal from the output unit regarding the modem as a sending source and a sending destination, and the diagnosis unit performs a fault diagnosis of each part from the output unit through the first internal communication line, the connector and the second internal communication line to the branch line based on a signal obtained through detection by the wave detector circuit.

(5) A charge communication system according to this aspect comprises: the communication device according to any one of the aspects (1) to (4); and a charging station that sends and receives the control signal and the modulated signal to and from the communication device through the charging cable.

(6) A transportation apparatus according to this aspect comprises the communication device according to any one of the aspects (1) to (4).

(7) A fault diagnosis method according to this aspect is a fault diagnosis method for the communication device comprising a connector to which a communication line is to be connected for sending and receiving a control signal concerning charge control between a transportation apparatus and a charging station, a modem outputting a modulated signal obtained by modulating information to be sent and demodulating the modulated signal input, and a first internal communication line and a second internal communication line each being connected between the connector and the modem, the first internal communication line and the second internal communication line respectively being for sending the modulated signal and being for receiving the modulated signal. The modem is capable of outputting a beacon signal for communication to the charging station through the first internal communication line and the communication line and outputting the beacon signal through the first internal communication line and the second internal communication line, and sends and receives the modulated signal by superposing the modulated signal on the control signal. The fault diagnosis method comprises: branching the beacon signal transmitted by way of the first internal communication line, the connector and the second internal communication line at an intermediate location and detecting the branched beacon signal, and performing a diagnosis of its own device based on a signal obtained through detection.

In the present aspect, the modem outputs a beacon signal for communication. The beacon signal is an analog signal and is transmitted to the branch line by way of the first internal communication line, the connector and the second internal communication line. The wave detector circuit detects the beacon signal having been transmitted so as to be branched to the branch line. In the case where a fault exists in an intermediate location of the communication path for the beacon signal, a signal obtained through detection by the beacon signal varies depending on the location and content of the fault. Furthermore, in the case where abnormality occurs in the modem itself as well, a signal obtained by detection is different from that obtained at a normal time. Accordingly, the communication device may detect the abnormality occurring at the connector and the internal circuit of its own device by analyzing the beacon signal.

Since such a configuration is employed that an analogue beacon signal is transmitted through the first internal communication line, the connector and the second internal communication line, and is then detected, a fault that could not be detected by merely monitoring the abnormality of sending and receiving of the modulated signal by the modem may also be detected. It is also possible to detect a fault at a prior stage where the communication of the modulated signal is disabled.

It is noted that the modem that outputs a modulated signal obtained by modulating the information to be sent and decodes the input modulated signal does not necessarily mean that the modem has a configuration to receive the modulated signal output by itself and demodulate this modulated signal.

According to the present aspect, the communication device detects that the charging cable of the charging station is connected to the transportation apparatus. If the charging cable is connected to the transportation apparatus, the transportation apparatus is highly likely to be being charged, and there is a fear that the sending and receiving of beacon signals and detecting of a beacon signal will be hampered. That is, there is a possibility that the fault diagnosis of the communication device may not accurately be performed. Hence, the communication device performs the fault diagnosis of its own device if the charging cable is not connected to the transportation apparatus. Accordingly, the communication device may perform an accurate fault diagnosis of its own device in a state where the sending and receiving of beacon signals and detecting of a beacon signal are not hampered.

According to the present aspect, the communication device determines whether or not the speed of the transportation apparatus is equal to or larger than a predetermined value. If the speed of the transportation apparatus is equal to or larger than the predetermined value, there is a low possibility that the apparatus is being charged, and there is no fear that the sending and receiving of beacon signals and detecting of a beacon signal will be hampered. That is, the communication device is in a state where the fault diagnosis thereof may accurately be performed. Hence, the communication device performs a fault diagnosis of its own device if the speed of the transportation apparatus is equal to or larger than the predetermined value. Accordingly, the communication device may perform an accurate fault diagnosis of its own device in the state where the sending and receiving of beacon signals and detecting of a beacon signal are not hampered.

Depending on the specifications of the modem, since it has a function of modulating or demodulating, the modem is configured to ignore the signal that has been sent by its own device even if it receives. That is, even if the modem sends a beacon signal to its own device, it cannot detects the signal, so that the control unit cannot perform a diagnosis of the on-vehicle PLC communication device.

However, according to this aspect, the beacon signal may be received and recognized by the wave detector circuit, so that if the result of detection is sent to the control unit, even such a modem may perform a diagnosis of its own device.

DETAILED DESCRIPTION OF EMBODIMENTS OF THE INVENTION

Examples of the communication device, the communication system, the transportation apparatus and the fault diagnosis method according to the embodiments of the present disclosure will be described below in detail with reference to the drawings. It is to be understood that the inventions herein disclosed are illustrative in all respects and not restrictive, and all changes that fall within the meanings and the bounds of the claims, or equivalence of such meanings and bounds are intended to be embraced by the claims.

Embodiment 1

FIG. 1 is a block diagram illustrating one example of the configuration of a charge communication system according to Embodiment 1. The charge communication system according to Embodiment 1 includes a vehicle (transportation apparatus) 1 such as a plug-in hybrid electric vehicle, an electric vehicle or the like, a charging cable 3 and a charging station 2 that supplies power to the battery of the vehicle 1 through the charging cable 3.

The charging cable 3 has one end portion connected to the charging station 2 and the other end portion provided with a charging gun 3a. The charging cable 3 includes two power supply lines 31, an in-cable communication line 32, an in-cable ground line 33 and so on. Each of the power supply lines 31 is a conducting wire to which voltage of DC (direct current) or AC (alternating current) output from the charging station 2 is to be applied. The in-cable communication line 32 is a conducting wire to transmit a control pilot signal for controlling the charging of the battery mounted on the vehicle 1. The in-cable ground line 33 is a conducting wire to be connected to the reference potential of the control pilot signal. The reference potential is the reference potential of the vehicle 1, for example, a body grounding. As will be described later, the in-cable communication line 32 and the in-cable ground line 33 also function as transmission media for differential signals to be sent and received so as to be superposed on the control pilot signals. The control pilot signal corresponds to a control signal in the aspect (1) while the differential signal corresponds to a modulated signal.

The charging station 2 is provided with a power supply device 7, a CPLT communication device 8 and a PLC communication device 9.

The power supply device 7 is connected to one end portions of the power supply lines 31 and supplies DC or AC to the vehicle 1 through the power supply lines 31.

The CPLT communication device 8 sends and receives control pilot signals to control the charging of the battery mounted on the vehicle 1 via the PLC communication device 9. The control pilot signal is, for example, a rectangular wave signal of 1 kHz. The CPLT communication device 8 sends and receives information concerning charging, such as the confirmation of the connection between the charging station 2 and the vehicle 1, the chargeability and the state of charge, etc. based on the potential of the rectangular wave signal relative to the reference potential, the presence or absence of the rectangular wave signal and the like. The power supply device 7 controls power supply by sending and receiving control pilot signals to and from the vehicle 1 by the CPLT communication device 8.

The PLC communication device 9 is connected to the in-cable communication line 32 and the in-cable ground line 33, and sends and receives information concerning charging to and from the vehicle 1 by using the in-cable communication line 32 and the in-cable ground line 33. More specifically, the PLC communication device 9 performs communication of information concerning charging with the vehicle 1 by sending and receiving control pilot signals on which differential signals of higher frequency than the control pilot signal, for example, differential signals at frequencies in the range of 2 to 30 MHz are superposed.

The vehicle 1 includes a charging device 4 to charge the battery, an on-vehicle CPLT communication device 5, an on-vehicle PLC communication device (communication device) 6, a connection detecting switch 10, a vehicle speed sensor 11 and so on. Inside the vehicle 1, the charging device 4, the on-vehicle-CPLT communication device 5 and the on-vehicle PLC communication device 6 are connected to one another through an in-vehicle network complying with a protocol of, for example, the controller area network (CAN) and may exchange information with one another.

The vehicle 1 is provided with an inlet 1a, and by connecting the charging gun 3a to the inlet 1a, the vehicle 1 is connected to the charging station 2 through the charging cable 3. The charging cable 3 is connected to the vehicle 1, so that the power supply lines 31 are connected to the charging device 4 while the in-cable communication line 32 and the in-cable ground line 33 are connected to the on-vehicle PLC communication device 6 through an in-vehicle communication line 60a and an in-vehicle ground line 60b, respectively.

The on-vehicle-CPLT communication device 5 is connected to the on-vehicle PLC communication device 6 through an in-vehicle CPLT line 60e, and sends and receives control pilot signals to and from the charging station 2 via the on-vehicle PLC communication device 6.

The on-vehicle PLC communication device 6 is connected to the in-vehicle communication line 60a and the in-vehicle ground line 60b and performs communication of information concerning charging with the charging station 2 by sending and receiving control pilot signals on which differential signals are superposed.

The charging device 4 is connected to the other ends of the power supply lines 31. The charging device 4 is a device to charge the battery by the DC or the AC supplied from the charging station 2 through the power supply lines 31. The charging device 4 controls the charging by sending and receiving control pilot signals by the on-vehicle-CPLT communication device 5.

The connection detecting switch 10 is a switch to detect that the charging gun 3a provided at the end portion of the charging cable 3 is connected to the inlet 1a of the vehicle 1. The connection detecting switch 10 is provided inside the inlet 1a of the vehicle 1, for example, and may be formed as a switch that is to be pressed by a part of the charging gun 3a such as the end portion or the side surface thereof that is inserted into the inlet 1a and may detect the presence or absence of the connection of the charging gun 3a depending on the presence or absence of a press. The connection detecting switch 10 outputs to the on-vehicle PLC communication device 6 a binary signal indicative of the presence or absence of a connection of the charging gun 3a as connection information. The on-vehicle PLC communication device 6 may determine whether or not the charging cable 3 is connected to the vehicle 1 by using the connection information output from the connection detecting switch 10.

The vehicle speed sensor 11 is provided with, for example, a magnetic pickup to generate a signal in proportion to the number of rotations of the axle provided in the vehicle 1, a noncontact sensor including a hall element and the like and a counter circuit to count the number of pulses sent from the noncontact sensor, and detects the speed of the vehicle 1 by measuring the number of pulses. The noncontact sensor is one example of the vehicle speed sensor 11, and the vehicle speed sensor 11 is not limited to such a configuration. For example, the vehicle speed sensor 11 may be configured so as to obtain the location information of the vehicle 1 detected by a GPS device and to detect the speed of the vehicle 1 based on the variation of the location of the vehicle 1.

Figure 2:
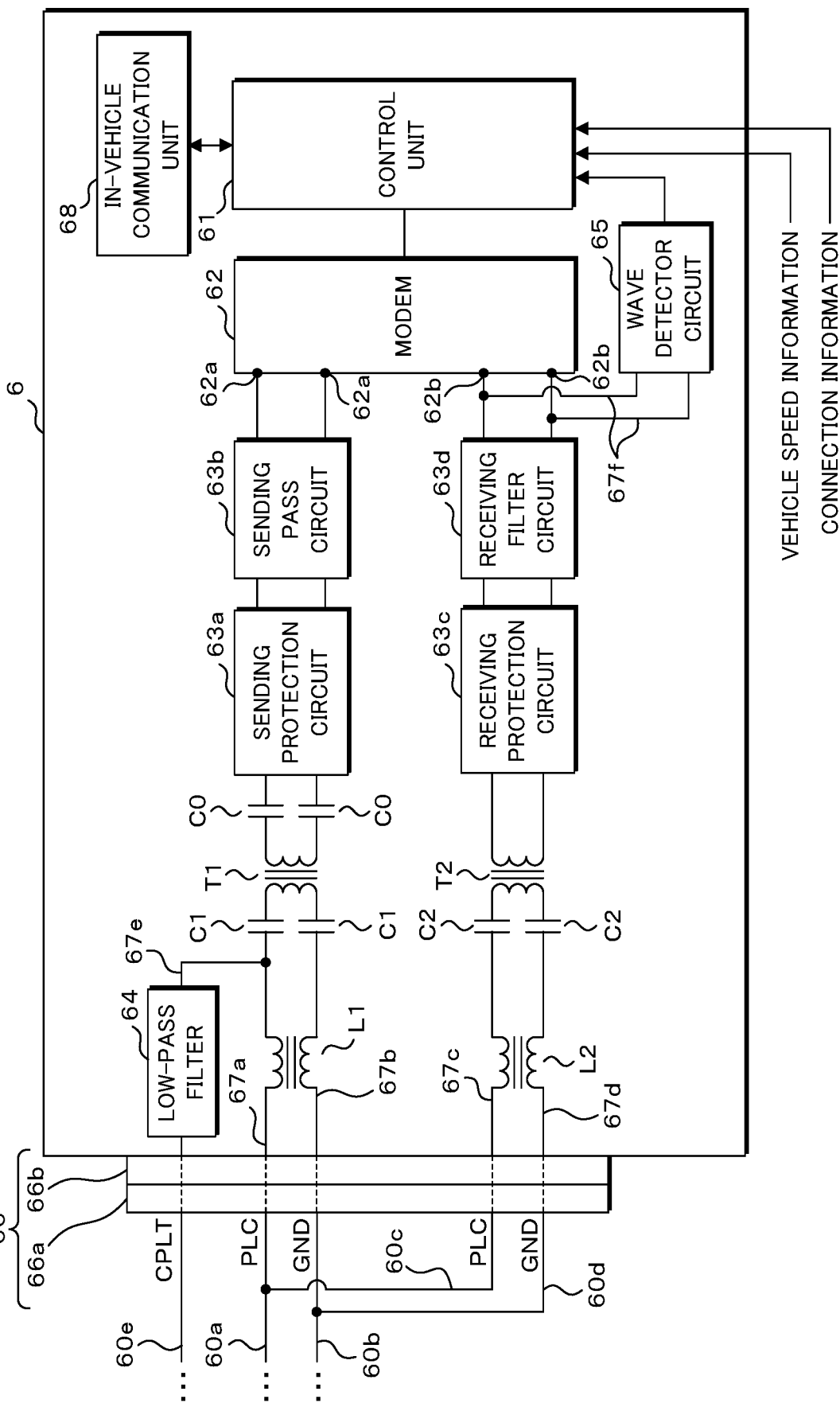
FIG. 2 is a circuit block diagram illustrating one example of the configuration of an on-vehicle PLC communication device.

FIG. 2 is a circuit block diagram illustrating one example of the configuration of the on-vehicle PLC communication device 6. The in-vehicle communication line 60a and the in-vehicle ground line 60b that are connected to the on-vehicle PLC communication device 6 are branched at an intermediate location. The on-vehicle PLC communication device 6 is provided with a connector 66 to be connected to the in-vehicle communication line 60a and the in-vehicle ground line 60b that serve as main lines, an in-vehicle communication line 60c and an in-vehicle ground line 60d that are respectively branched from the in-vehicle communication line 60a and the in-vehicle ground line 60b, and the in-vehicle CPLT line 60e. The connector 66 is composed of a plug 66a and a receptacle 66b, for example. Connected to the plug 66a are one end portions of the in-vehicle communication lines 60a and 60c, one end portions of the in-vehicle ground lines 60b and 60d, and one end portion of the in-vehicle CPLT line 60e. The other end portions of the in-vehicle communication line 60a and the in-vehicle ground line 60b are connected to the inlet 1a. The receptacle 66b is connected to one end portions of a first internal communication line 67a and a second internal communication line 67c, one end portions of a first internal ground line 67b and a second internal ground line 67d, and one end portion of an internal CPLT line 67e that are disposed inside the on-vehicle PLC communication device 6. The plug 66a is connected to the receptacle 66b of the on-vehicle PLC communication device 6, so that the in-vehicle communication lines 60a and 60c, the in-vehicle ground lines 60b and 60d and the in-vehicle CPLT line 60e are respectively connected to the first and the second internal communication lines 67a and 67c, the first and the second internal ground lines 67b and 67d and the internal CPLT line 67e that are disposed inside the device.

The first internal communication line 67a and the first internal ground line 67b are each connected to a signal output terminal (output unit) 62a of a modem 62 via a first common mode choke coil L1, a first coupling capacitor C1, a first coupling transformer T1, a DC bias cut capacitor C0, a sending protection circuit 63a and a sending pass circuit 63b. The first common mode choke coil L1 is an element to remove common mode noise put on a differential signal. The first coupling capacitor C1 and the first coupling transformer T1 each are a circuit to superpose the differential signal output from the modem 62 on a control pilot signal. The DC bias cut capacitor C0 is a capacitor to cut out a direct-current component. The sending protection circuit 63a is a circuit to protect the circuit on the sending side of the modem 62. The sending pass circuit 63b is a filter to pass through only the signal component to be sent, for example, a band-pass filter.

The second internal communication line 67c and the second internal ground line 67d are each connected to a signal input terminal (input unit) 62b of the modem 62 via a second common mode choke coil L2, a second coupling capacitor C2, a second coupling transformer T2, a receiving protection circuit 63c and a receiving filter circuit 63d. The second common mode choke coil L2 is an element to remove common mode noise put on the differential signal. The second coupling capacitor C2 and the second coupling transformer T2 each are a circuit to separate a differential signal superposed on a control pilot signal that is sent from the charging station 2 from the control pilot signal and to output the differential signal to the modem 62 side. The receiving protection circuit 63c is a circuit to protect the circuit on the receiving side of the modem 62. The receiving filter circuit 63d is a filter to pass through only the signal component to be received, for example, a band-pass filter.

The modem 62 operates according to the control by the control unit 61. The control unit 61 provides the modem 62 with the digital data of the information to be sent to the charging station 2 and instructs the modem 62 to send the information. The modem 62 modulates the digital data into a differential signal and outputs the modulated differential signal from the signal output terminal 62a to the first internal communication line 67a and the in-vehicle communication line 60a. The differential signal output from the signal output terminal 62a of the modem 62 is superposed on a control pilot signal by the first coupling transformer T1 and the first coupling capacitor C1, and the resultant signal is transmitted through the first internal communication line 67a, the in-vehicle communication line 60a and the in-cable communication line 32 and sent to the charging station 2.

In the case where a differential signal sent from the charging station 2 is input to the signal input terminal 62b of the modem 62, the modem 62 demodulates the differential signal input to the signal input terminal 62b to digital data and provides the digital data obtained through the demodulation to the control unit 61.

Furthermore, depending on the specifications of the modem 62, since it performs functions such as modulation and demodulation, the modem 62 is configured to ignore at the signal input terminal 62b the beacon signal sent from the signal output terminal 62a by the modem 62 itself. That is, even if the modem 62 sends a beacon signal to its own device, it cannot detect the beacon signal input to the signal input terminal 62b, so that the control unit 61 cannot diagnose the fault of the on-vehicle PLC communication device 6.

Moreover, the on-vehicle PLC communication device 6 has a function of performing a diagnosis of a fault of its own device. The modem 62 voluntarily outputs a beacon signal for communication from the signal output terminal 62a in order to perform communication with the charging station 2. The beacon signal is an analog signal having a predetermined signal pattern. The beacon signal is a burst signal sent for several hundred microseconds every several dozen of milliseconds. The burst signal is a signal intermittently sent over the period of sending. That is, a single mass of the burst signal according to Embodiment 1 is composed of multiple signals intermittently sent at intervals of several microseconds. The beacon signal for communication with the charging station 2 that is output from the modem 62 is transmitted to the charging station 2 through the first internal communication line 67a, the in-vehicle communication line 60a and the in-cable communication line 32. Furthermore, the beacon signal for communication to be used for fault diagnosis of its own device that is output from the modem 62 is transmitted through the first internal communication line 67a and the second internal communication line 67c. More specifically, the beacon signal is transmitted through the sending pass circuit 63b, the sending protection circuit 63a, the DC bias cut capacitor C0, the first coupling transformer T1, the first coupling capacitor C1, the first common mode choke coil L1, the connector 66, the in-vehicle communication lines 60a and 60c, the connector 66, the second common mode choke coil L2, the second coupling capacitor C2, the second coupling transformer T2, the receiving protection circuit 63c, the receiving filter circuit 63d and is then input to the signal input terminal 62b of the modem 62 and a wave detector circuit 65.

The on-vehicle PLC communication device 6 is provided with branch lines 67f branched at intermediate locations on the second internal communication line 67c and on the second internal ground line 67d, and the wave detector circuit 65 that detects a beacon signal transmitted via the first internal communication line 67a, the connector 66 and the second internal communication line 67c to each of the branch lines 67f. More specifically, the branch lines 67f is branched between the receiving filter circuit 63d and the modem 62, and the wave detector circuit 65 detects a beacon signal transmitted to the branch line 67f via the first internal communication line 67a, the connector 66, the in-vehicle communication lines 60a and 60c and the second internal communication line 67c, and outputs a fault detection signal obtained through detection to the control unit 61. Hereafter, the signal obtained by the wave detector circuit 65 detecting the beacon signal is referred to as a fault detection signal. The wave detector circuit 65 obtains a rectangular-wave fault detection signal by detecting the beacon signal. The fault detection signal is a signal with a part corresponding to a burst section representing the high level and a part corresponding to no burst section representing the low level. The detection method by the wave detector circuit 65 is not limited to a particular method.

The concrete configuration of the wave detector circuit 65 will be described below.

The wave detector circuit 65 is provided with, for example, an amplifier bias circuit, a hold circuit and a comparator. The amplifier bias circuit is a circuit to amplify the signal that is sent to the wave detector circuit 65 from the modem 62 through a predetermined circuit as well as to apply constant bias voltage thereto, and outputs the amplified signal to the hold circuit.

The hold circuit is a circuit to hold the peak voltage of the signal amplified by the amplifier bias circuit for a constant period of time. As will be described later, the beacon signal according to Embodiment 1 includes a burst signal sent at predetermined time intervals. A single mass of the burst signal is an aggregate of multiple signals intermittently sent at intervals of several microseconds. Accordingly, if the burst signal input to the wave detector circuit 65 is merely amplified as it is, the width between the signals constituting the burst signal is too narrow to detect the width of the entire burst signal, the voltage, the sending interval between the burst signal and another burst signal and so on. The hold circuit performs envelope detection of the burst signal by holding the multiple signals constituting the burst signal. More specifically, the hold circuit holds the multiple signals constituting the burst signal so that they are converted into a detection signal corresponding to an envelope of the entire burst signal and outputs the converted detection signal to the comparator.

The comparator converts the detection signal into a rectangular-wave fault detection signal by comparing the detection signal and a predetermined threshold voltage, and outputs the fault detection signal to the control unit 61.

The wave detector circuit 65 thus configured outputs a fault detection signal of high level voltage during which a burst signal is input to the wave detector circuit 65 and outputs a fault detection signal of low level voltage during which no burst signal is input.

The control unit 61 obtains the fault detection signal output from the wave detector circuit 65, performs a fault diagnosis of the on-vehicle PLC communication device 6 based on the obtained fault detection signal, and stores the result of the diagnosis. The control unit 61 functions as a diagnosis unit in the aspect (1). The detail of the configuration and the content of the processing performed by the control unit 61 will be described later.

Meanwhile, the internal CPLT line 67e has one end connected to an appropriate location of the first internal communication line 67a, for example, between the first common mode choke coil L1 and the first coupling capacitor C1 and the other end connected to the receptacle 66b via a low-pass filter 64. The control pilot signal sent from the charging station 2 is transmitted through the in-vehicle communication line 60a and input to the on-vehicle PLC communication device 6. The control pilot signal input to the on-vehicle PLC communication device 6 is transmitted through the internal CPLT line 67e and output to the outside of the on-vehicle PLC communication device 6 via the low-pass filter 64. The low-pass filter 64 is a filter to remove the differential signal superposed on the control pilot signal. The control pilot signal output from the on-vehicle PLC communication device 6 is sent to the on-vehicle-CPLT communication device 5 through the in-vehicle CPLT line 60e. Similarly, the control pilot signal sent from the on-vehicle-CPLT communication device 5 is transmitted by way of the in-vehicle CPLT line 60e, the low-pass filter 64 inside the on-vehicle PLC communication device 6 and the internal CPLT line 67e and sent through the in-vehicle communication line 60a and the in-cable communication line 32 to the charging station 2.

Moreover, the on-vehicle PLC communication device 6 is provided with an in-vehicle communication unit 68 to perform communication with the charging device 4, the on-vehicle-CPLT communication device 5 and so on via the in-vehicle network. The in-vehicle communication unit 68 sends information to another device by outputting a signal generated based on the information to be sent provided from the control unit 61 to the bus or the like of the in-vehicle network. The in-vehicle communication unit 68 samples the signal output from another device by monitoring the voltage of the bus or the like of the in-vehicle network and provides the control unit 61 with the information obtained from the sampled signal.

Furthermore, the connection information indicative of the result of the connection detection output by the connection detecting switch 10 and the vehicle speed information output from the vehicle speed sensor 11 are input to the control unit 61. According to the present embodiment, the control unit 61 controls the operation of the modem 62 based on the input connection information and vehicle speed information.

Figure 3:
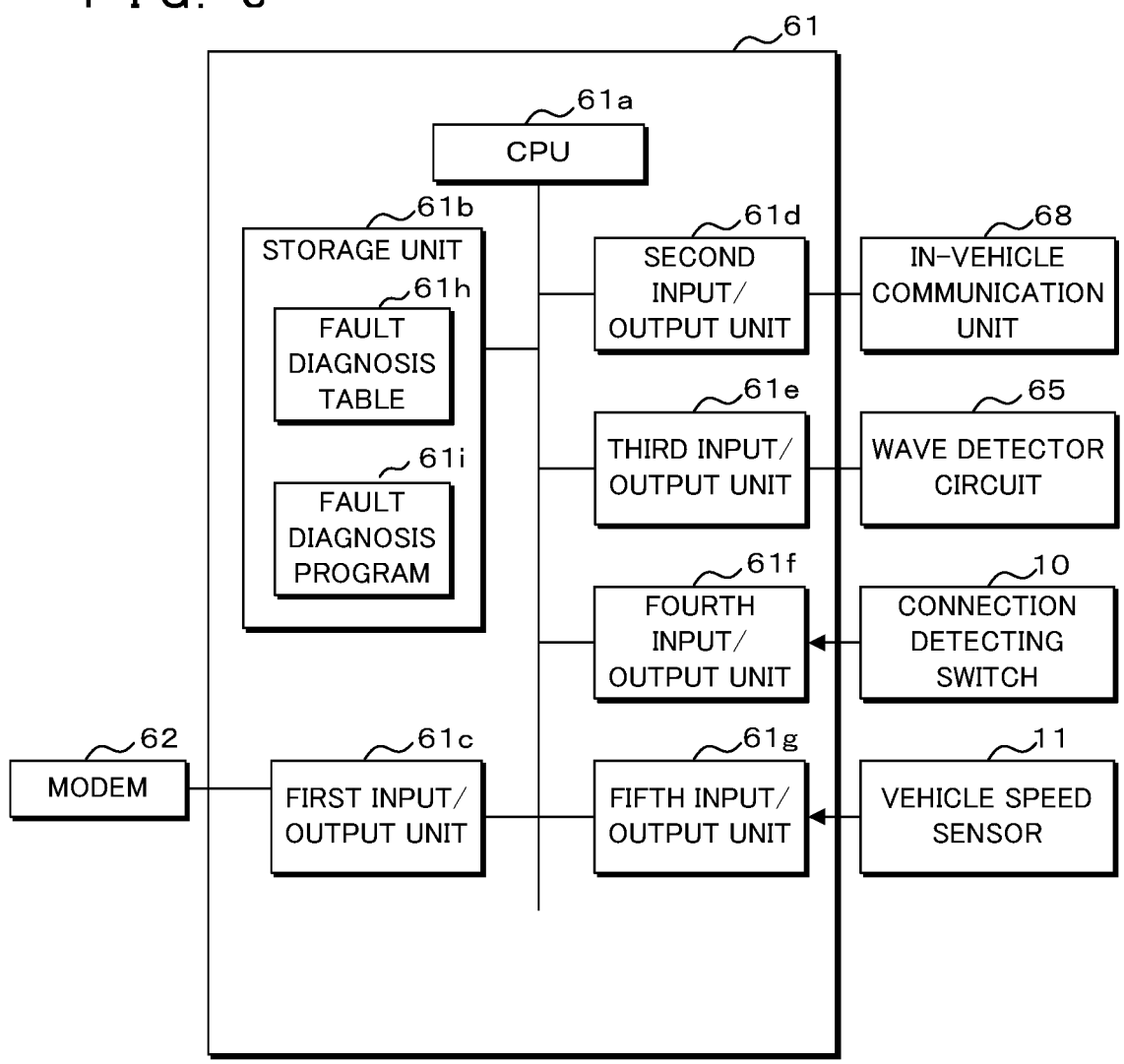
FIG. 3 is a block diagram illustrating an internal configuration of a control unit.

FIG. 3 is a block diagram illustrating an internal configuration of the control unit 61. The control unit 61 is a microprocessor having a central processing unit (CPU) 61a and so on. The CPU 61a is connected via a bus to a storage unit 61b, a first input/output unit 61c, a second input/output unit 61d, a third input/output unit 61e, a fourth input/output unit 61f and a fifth input/output unit 61g and so on. The modem 62, the in-vehicle communication unit 68, the wave detector circuit 65, the connection detecting switch 10 and the vehicle speed sensor 11 are respectively connected to the first input/output unit 61c, the second input/output unit 61d, the third input/output unit 61e, the fourth input/output unit 61f and the fifth input/output unit 61g.

The storage unit 61b includes, for example, a nonvolatile memory and a volatile memory. The nonvolatile memory is, for example, a ROM such as an EEPROM. The nonvolatile memory stores a control program required for the initial operation of the computer and a fault diagnosis program 61i for executing a fault diagnosis and the like of its own device by controlling the operation of the on-vehicle PLC communication device 6. The volatile memory is, for example, a dynamic RAM (DRAM), a static RAM (SRAM) or the like and temporarily stores the control program read from the nonvolatile memory when arithmetic processing is executed by the CPU 61a, the fault diagnosis program 61i or various data generated by the arithmetic processing executed by the CPU 61a. Furthermore, the storage unit 61b stores a fault diagnosis table 61h to perform a fault diagnosis of its own device. The fault diagnosis table 61h stores the waveforms and cycles of the fault detection signals obtained through detection by the wave detector circuit 65, the locations of the faults and the contents of the faults in association with one another.

The digital data sent by the charging device 4 via the in-vehicle network is received by the in-vehicle communication unit 68 and is given to the control unit 61. The CPU 61a of the control unit 61 obtains the digital data output from the in-vehicle communication unit 68 via the second input/output unit 61d and outputs the obtained digital data to the modem 62 via the first input/output unit 61c. The modem 62 modulates the digital data into a differential signal and outputs the same to the first internal communication line 67a and the in-vehicle communication line 60a. Moreover, the modem 62 demodulates a differential signal sent from the charging station 2 and outputs digital data obtained through demodulation to the control unit 61. The CPU 61a performs sending to the charging device 4 by obtaining the digital data output from the modem 62 via the first input/output unit 61c and outputting the obtained digital data to the in-vehicle communication unit 68 via the second input/output unit 61d. Thus, the on-vehicle PLC communication device 6 performs information communication with the charging station 2.

Furthermore, the CPU 61a executes the fault diagnosis program 61i stored in the storage unit 61b to thereby control the operation of each of the components and perform a fault diagnosis of the on-vehicle PLC communication device 6 being its own device. More specifically, the CPU 61a instructs the modem 62 to output a beacon signal via the first input/output unit 61c and obtains a fault detection signal output by the wave detection circuit 65 via the third input/output unit 61e. The CPU 61a then performs a diagnosis of its own device based on the obtained fault detection signal.

Furthermore, the CPU 61a obtains the connection information from the connection detecting switch 10 via the fourth input/output unit 61f while obtaining the vehicle speed information from the vehicle speed sensor 11 via the fifth input/output unit 61g. The CPU 61a performs communication processing with the charging station 2 and fault diagnosis processing for the inside of the on-vehicle PLC communication device 6 based on the obtained connection information and vehicle speed information.

Figure 4:
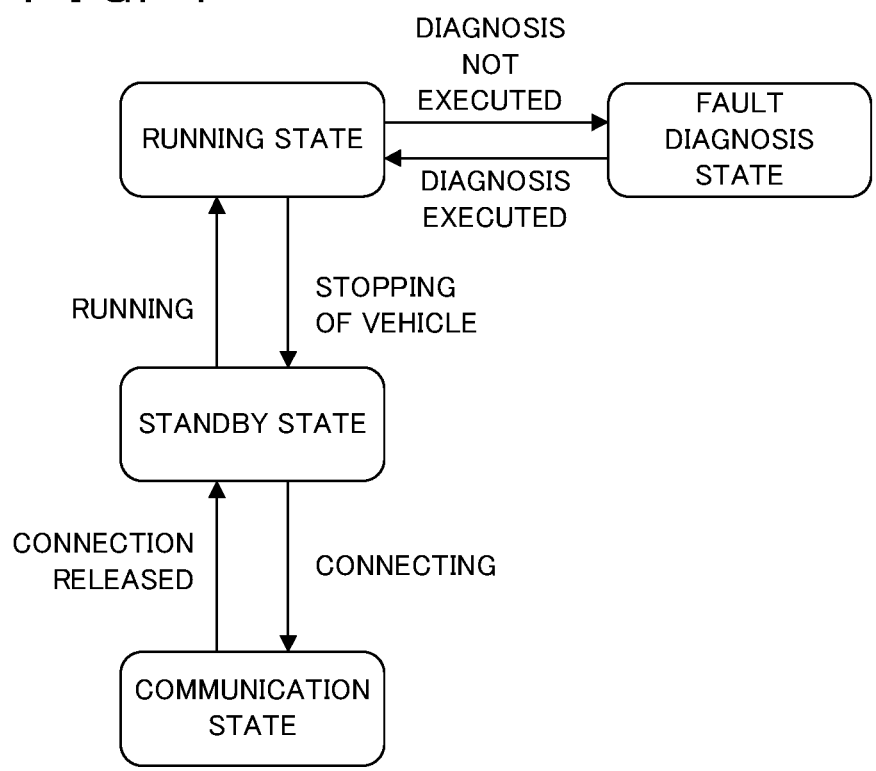
FIG. 4 is a state transition diagram for depicting communication processing and fault diagnosis processing to be performed by the on-vehicle PLC communication device.

FIG. 4 is a state transition diagram for depicting communication processing and fault diagnosis processing to be performed by the on-vehicle PLC communication device 6. The on-vehicle PLC communication device 6 according to the present embodiment performs communication processing with the charging station 2 and fault diagnosis processing for the inside of the on-vehicle PLC communication device 6 while shifting among four states, a standby state, a running state, a fault diagnosis state and a communication state.

In the case where the speed of the vehicle 1 is smaller than a predetermined value and the charging gun 3 is not connected to the inlet 1a of the vehicle 1, the on-vehicle PLC communication device 6 enters the standby state. The standby state is a state where the connection with the charging station 2 is held on standby.

If the speed of the vehicle 1 changes to a predetermined value or larger in the standby state, the on-vehicle PLC communication device 6 shifts to the running state. In the running state, the on-vehicle PLC communication device 6 is supplied with power from a battery for traveling, a battery for auxiliary machinery and the like, and enters a state where a fault diagnosis processing is possible.

If the charging gun 3a is connected to the inlet 1a of the vehicle 1 in the standby state, the on-vehicle PLC communication device 6 shifts to the communication state. The communication state is a state where the vehicle 1 and charging station 2 are connected to each other via the charging cable 3, so that communication with charging station 2 is being performed or is possible. If the connection of the charging gun 3 is released in the communication state, the on-vehicle PLC communication device 6 shifts to the standby-state.

After shifting from the standby state to the running state, the on-vehicle PLC communication device 6 determines in the running state whether or not the fault diagnosis processing has been executed. If the fault diagnosis processing has not yet been executed, the on-vehicle PLC communication device 6 shifts to the fault diagnosis state. The fault diagnosis state is a state where the on-vehicle PLC communication device 6 performs a fault diagnosis by outputting a beacon signal from the modem 62. If the fault diagnosis processing is ended, the on-vehicle PLC communication device 6 shifts to the running state. Here, the on-vehicle PLC communication device 6 stores whether or not the fault diagnosis processing has been performed as information such as a flag or the like and does not perform the processing again after the fault diagnosis processing is performed once. It is noted that if the running state shifts to the standby state, the stored information of the flag is reset. For this reason, if the standby state shifts to the running state, the on-vehicle PLC communication device 6 performs a fault diagnosis.

Moreover, if the speed of the vehicle 1 changes to be smaller than a predetermined value in the running state, the on-vehicle PLC communication device 6 shifts to the standby state.

Next, the processing to be performed by the on-vehicle PLC communication device 6 will be described by using flowcharts. It is noted that the processing depicted in the following flowcharts is processing achieved by the control unit 61 of the on-vehicle PLC communication device 6 executing the fault diagnosis program 61i stored in the storage unit 61b.

Figure 5:
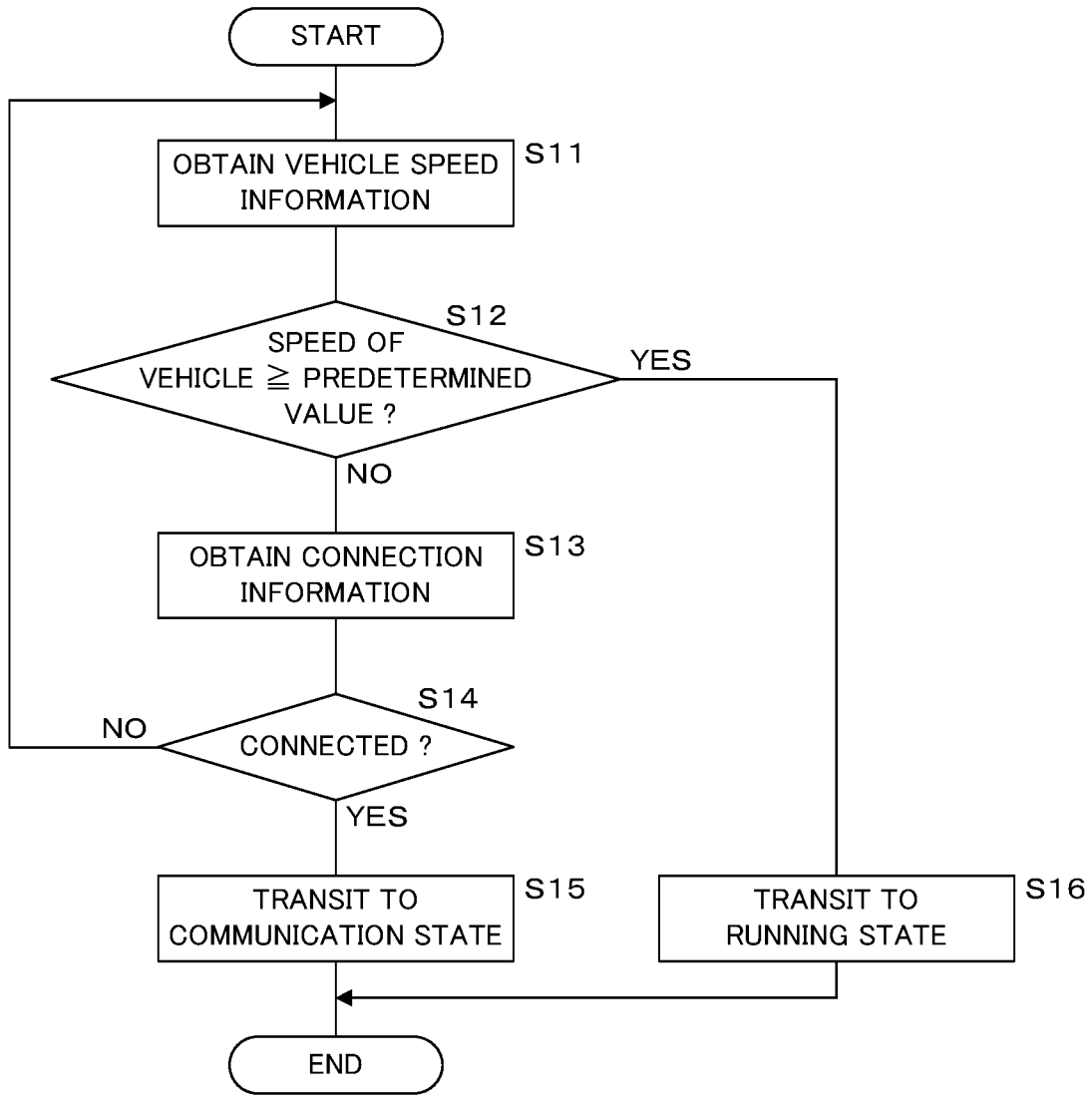
FIG. 5 is a flowchart depicting the processing procedure to be executed by the on-vehicle PLC communication device in a standby state.

FIG. 5 is a flowchart depicting the processing procedure to be performed by the on-vehicle PLC communication device 6 in the standby state. In the standby state, the control unit 61 of the on-vehicle PLC communication device 6 obtains vehicle speed information (step S11) and determines whether or not the speed of the vehicle 1 is equal to or larger than a predetermined value (step S12).

If the speed of the vehicle 1 is equal to or larger than the predetermined value (step S12: YES), the control unit 61 shifts the operating state from the standby state to the running state (step S16) and ends the processing in the standby state.

If the speed of the vehicle 1 is smaller than the predetermined value (step S12: NO), the control unit 61 obtains the connection information indicative of the connection state between the charging cable 3 and the vehicle 1 (step S13) and determines whether or not the charging cable 3 is connected to the vehicle 1 (step S14). If the charging cable 3 is not connected thereto (step S14: NO), the control unit 61 returns the processing to step S11. If the charging cable 3 is connected thereto (step S14: YES), the control unit 61 shifts the operating state from the standby state to the communication state (step S15) and ends the processing in the standby state.

Figure 6:
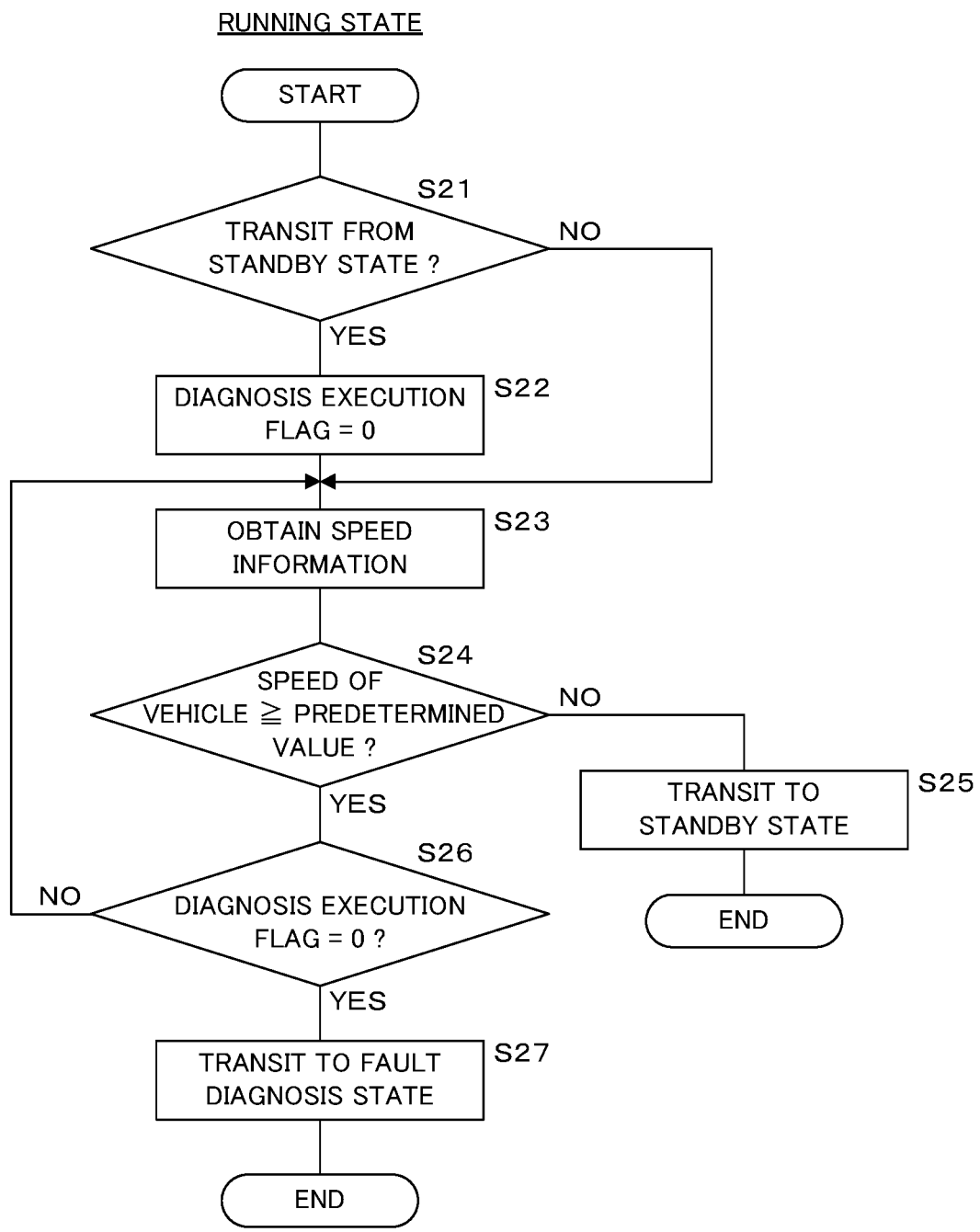
FIG. 6 is a flowchart depicting the processing procedure to be executed by the on-vehicle PLC communication device in a running state.

FIG. 6 is a flowchart depicting the processing procedure to be executed by the on-vehicle PLC communication device 6 in the running state. In this processing, the control unit 61 uses a diagnosis execution flag indicating whether or not a fault diagnosis has been performed. This diagnosis execution flag is achieved by using, for example, a register or a certain storage area or the like of the storage unit 61b contained in the CPU 61a of the control unit 61. The diagnosis execution flag indicates that a fault diagnosis has not yet been executed when the value thereof is 0 and indicates that a fault diagnosis has already been executed when the value thereof is 1.

The control unit 61 of the on-vehicle PLC communication device 6 having been shifted from the standby state to the running state determines whether or not the standby state has been shifted to the running state (step S21). If it is determined that the standby state has been shifted to the running state (step S21: YES), the control unit 61 sets the value of the diagnosis execution flag to 0 (step S22). If the processing at step S22 is completed, or if it is determined the standby state has not been shifted to the running state (step S21: NO), for example, if it has already been in the running state or if the fault diagnosis state has shifted to the running state, the control unit 61 obtains the speed information of the vehicle 1 (step S23) and determines whether or not the speed of the vehicle 1 is equal to or larger than a predetermined value (step S24). It is noted that the control unit 61 that performs the processing at step S23 functions as a vehicle speed information obtainment unit in the aspect (3).

If the speed of the vehicle 1 is smaller than the predetermined value (step S24: NO), the control unit 61 shifts the operating state from the running state to the standby state (step S25) and ends the processing in the running state.

If the speed of the vehicle 1 is equal to or larger than the predetermined value (step S24: YES), the control unit 61 determines whether or not the value of the diagnosis execution flag is 0 (step S26). If the value of the diagnosis execution flag is 1 (step S26: NO), that is, if a fault diagnosis has already been executed, the control unit 61 returns the processing to step S23. If the value of the diagnosis execution flag is 0 (step S26: YES), that is, if a fault diagnosis has not yet been executed, the control unit 61 shifts the operating state from the running state to the fault diagnosis state (step S27) and ends the processing in the running state.

It is noted that the speed information of the vehicle 1 is utilized for determining whether or not the vehicle 1 is running in the above description, but the shift range information of the vehicle 1 may be utilized in place thereof. If the shift range is "D," it is determined that the vehicle 1 is running while if the shift range is "P," it is determined that the vehicle is not running. In the case where the shift range information is utilized in place of the speed information, this facilitates the determination whereas even in the case where the vehicle 1 is in a state of the "P" range and braked immediately before the completion of parking of the vehicle 1, it may be determined that the vehicle is in a running state, and a fault diagnosis is executed. Accordingly, the speed information allows for more accurate determination than the shift range information as to the situation where a fault diagnosis should be made.

Figure 7:
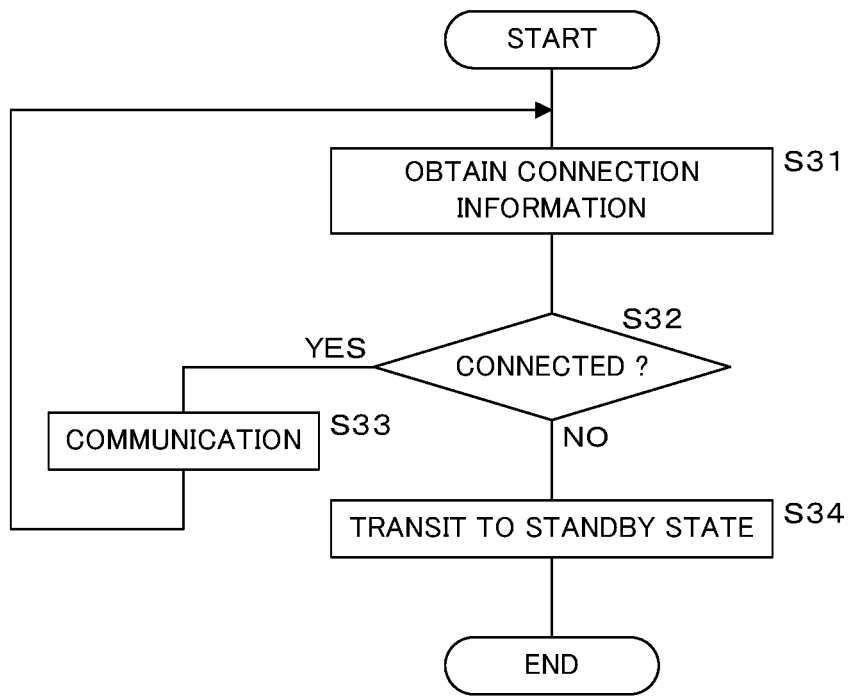
FIG. 7 is a flowchart depicting the processing procedure to be executed by the on-vehicle PLC communication device in a communication state.

FIG. 7 is a flowchart depicting the processing procedure to be executed by the on-vehicle PLC communication device 6 in the communication state. In the communication state, the control unit 61 of the on-vehicle PLC communication device 6 obtains the connection information indicative of the connection state between the vehicle 1 and the charging cable 3 (step S31) and determines whether or not the charging cable 3 is connected to the vehicle 1 (step S32) based on the signal detected by the connection detecting switch 10. If the charging cable 3 is connected thereto (step S32: YES), the control unit 61 performs required communication processing concerning charging (step S33) and returns the processing to step S31. If the charging cable 3 is not connected thereto (step S32: NO), the control unit 61 shifts the operating state from the communication state to the standby state (step S34) and ends the processing in the communication state.

FIG. 8 is a flowchart depicting the processing procedure to be executed by the on-vehicle PLC communication device 6 in the fault diagnosis state. The control unit 61 of the on-vehicle PLC communication device 6 having shifted from the running state to the fault diagnosis state obtains a fault detection signal via the third input/output unit 61e (step S41). The control unit 61 then specifies the waveform of the fault detection signal (step S42) and specifies the cycles thereof (step S43). The control unit 61 performs a fault diagnosis by searching for the fault location and the content of the fault corresponding to the waveform and the cycles from the fault diagnosis table 61h based on the waveform and the cycles of the fault detection signal specified at steps S42 and S43 (step S44). The control unit 61 stores the result of the fault diagnosis at step S44 in the storage unit 61b (step S45).

Next, the control unit 61 sets the value of the diagnosis execution flag to 1 (step S46). The control unit 61 shifts the operating state from the fault diagnosis state to the running state (step S47) and ends the processing in the fault diagnosis state.

The on-vehicle PLC communication device 6 according to Embodiment 1 configured as described above may detect the fault inside the on-vehicle PLC communication device 6 and the fault of the connector 66. More specifically, the on-vehicle PLC communication device 6 according to Embodiment 1 may detect the faults of the modem 62, the sending pass circuit 63b, the sending protection circuit 63a, the DC bias cut capacitor C0, the first coupling transformer T1, the first coupling capacitor C1, the first common mode choke coil L1, the connector 66, the second common mode choke coil L2, the second coupling capacitor C2, the second coupling transformer T2, the receiving protection circuit 63c and the receiving filter circuit 63d.

Furthermore, the control unit 61 may specify the fault location and the content of the fault by using the fault diagnosis table 61h.

Moreover, while grasping the communication status, the on-vehicle PLC communication device 6 may accurately perform a fault diagnosis of the inside of the on-vehicle PLC communication device 6 and the connector 66 in the state where communication and detection by a beacon signal are not hindered. For example, the on-vehicle PLC communication device 6 performs processing while shifting among the four states, the standby state, the running state, the fault diagnosis state and the communication state as communication-related states.

More specifically, since the on-vehicle PLC communication device 6 performs a fault diagnosis in the state where the charging cable 3 of the charging station 2 is not connected to the vehicle 1, this prevents the communication and detection by a beacon signal from being hindered by the electronic components constituting the charging station 2 and charging cable 3, so that the on-vehicle PLC communication device 6 may accurately perform a diagnosis of the fault inside the on-vehicle PLC communication device 6 and the fault of the connector 66.

Moreover, since the on-vehicle PLC communication device 6 performs a fault diagnosis while the vehicle 1 is running, it may accurately perform a diagnosis of the fault inside the on-vehicle PLC communication device 6 and the fault of the connector 66 under the situation where the communication and detection by the beacon signal are not hindered.

It is to be noted that, as used herein and in the appended claims, the singular forms "a", "an", and "the" include plural referents unless the context clearly dictates otherwise.

Although the present invention has been described using the embodiment, the technical scope of the present invention is not limited to the scope described in the above-mentioned embodiment. It is to be understood that embodiments obtained by adding many modifications and variations are added to the above-mentioned embodiment will be apparent to those skilled in the art. It will also be obvious from the claims that the technical scope of the present invention encompasses the embodiments to which such modification and variation are added.

While the present invention has been described using, for example, a vehicle in the above-described embodiment, the present invention is applicable to general transportation apparatuses having a driving mechanism a part of which is eclectically operated such as an inverted pendulum mobile unit including an electric motorcycle, a ship, a plane, a personal mobility and an electric motorcycle saddle-ridden by a crew, and it is obvious that these are also included in the technical scope of the present invention.

What is claimed is:

1. A communication device including a communication line for sending and receiving a charge control signal between a transportation apparatus and a charging apparatus configured to send and receive a charge control signal between a transportation apparatus and a charging apparatus, the communication device comprising:
   a connector connected to the communication line;
   a modem modulating a signal, outputting a modulated signal and demodulating a modulated signal input, the modem including an output unit and an input unit;
   a first internal communication line and a second internal communication line each being connected to the connector and the modem, wherein the first internal communication line is connected to the output unit of the modem and the second internal communication line is connected to the input line of the modem, the first internal communication line and the second internal communication line respectively being for sending the modulated signal and being for receiving the modulated signal, wherein the modem is capable of outputting a beacon signal for communication to the charging apparatus through the first internal communication line and the communication line and outputting the beacon signal through the first internal communication line and the second internal communication line, and sends and receives the modulated signal by superposing the modulated signal on the charge control signal, wherein the modem outputs the beacon signal from the output unit as a sending source and a sending destination;

a branch line branched from an intermediate location of the second internal communication line;

a wave detector circuit that detects the beacon signal transmitted to the branch line by way of the first internal communication line, the connector and the second internal communication line; and a diagnosis unit that performs a fault diagnosis of the communication device based on a detected signal, wherein the diagnosis unit performs the fault diagnosis for each part from the output unit through the first internal communication line, the connector and the second internal communication line to the branch line based on a detected signal.

2. The communication device according to claim 1, further comprising an obtainment unit that obtains connection information indicative of a connection or a disconnection of a charging cable of the charging apparatus and the transportation apparatus, wherein the diagnosis unit performs a fault diagnosis of an own device if the connection information indicates the disconnection of the charging cable.

3. The communication device according to claim 1, further comprising a vehicle speed information obtainment unit that obtains vehicle speed information indicative of a speed of the transportation apparatus mounted with the own device, wherein the diagnosis unit performs a fault diagnosis of the own device if a speed indicated by the obtained vehicle speed information is equal to or larger than a predetermined value.

4. A charge communication system comprising:
the communication device according to claim 1; and
a charging apparatus that sends and receives the charge control signal and the modulated signal to and from the communication device through the charging cable.

5. A transportation apparatus comprising the communication device according to claim 1.

6. A fault diagnosis method of a communication device having a connector connected to a communication line, the communication line for sending and receiving a charge control signal between a transportation apparatus and a charging apparatus, the method comprising:

providing a modem modulating a signal, outputting a modulated signal and demodulating a modulated signal input, the modem including an output unit and an input unit, providing a first internal communication line and a second internal communication line each being connected between the connector and the modem, wherein the first internal communication line is connected to the output unit of the modem and the second internal communication line is connected to the input line of the modem, the first internal communication line and the second internal communication line respectively being for sending the modulated signal and being for receiving the modulated signal, wherein the modem is capable of outputting a beacon signal for communication to the charging apparatus through the first internal communication line and the communication line and outputting the beacon signal through the first internal communication line and the second internal communication line, and sends and receives the modulated signal by superposing the modulated signal on the charge control signal, wherein the modem outputs the beacon signal from the output unit as a sending source and a sending destination;

branching the beacon signal transmitted by way of the first internal communication line, the connector and the second internal communication line at an intermediate location and detecting the branched beacon signal, and performing a diagnosis of the communication device based on a signal obtained through detection, wherein the diagnosis unit performs the fault diagnosis for each part from the output unit through the first internal communication line, the connector and the second internal communication line to the branch line based on a detected signal.

* * * * *